United States Patent [19]
Craven

[11] 3,831,229
[45] Aug. 27, 1974

[54] ENVIRONMENT FREE SNAP HOOK
[75] Inventor: Wilbur J. Craven, Glastonbury, Conn.
[73] Assignee: Stanadyne, Inc., Windsor, Conn.
[22] Filed: Feb. 20, 1973
[21] Appl. No.: 333,963

[52] U.S. Cl............................ 24/235, 24/230.5 BA
[51] Int. Cl............................................. A44b 13/02
[58] Field of Search...... 24/230.5 S, 230.5 BA, 232, 24/233, 234, 235; 294/78, 82, 83

[56] References Cited
UNITED STATES PATENTS
3,159,891  12/1964  Brewer................................ 24/235
3,194,598  7/1965   Goldfuss............................. 24/235

FOREIGN PATENTS OR APPLICATIONS
1,078,645  8/1967  Great Britain...................... 24/234

Primary Examiner—Bobby R. Gay
Assistant Examiner—Kenneth J. Dorner
Attorney, Agent, or Firm—Prtuzman, Hayes, Kalb & Chilton

[57] ABSTRACT

A forged snap hook is provided with an integral base plate for attachment to a parachute harness. A resiliently biased high strength corrosion treated guard is pivoted on the hook and has a hollow crown with slotted depending sidewalls. A winged finger piece is shaped to form an interlocked dovetail joint with the guard and the wings of the fingerplate overlap the slot of the guard and extend laterally therefrom adjacent the crown to reinforce the guard.

5 Claims, 4 Drawing Figures

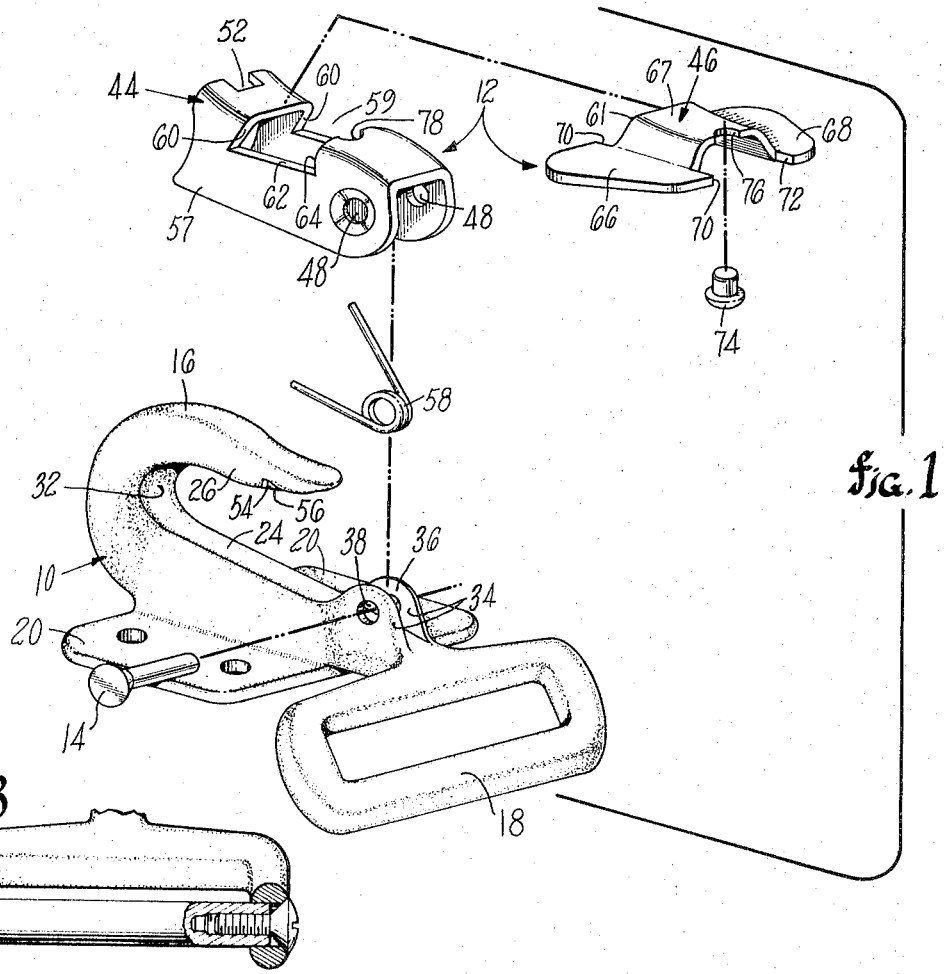

ENVIRONMENT FREE SNAP HOOK

The present invention relates in general to snap hooks and more particularly to a snap hook having a special utility for use in conjunction with parachute harnesses and the like.

It is an object of the present invention to provide an improved snap hook constructed so that it will not be accidentally released and yet is so arranged so that it can easily and quickly be released without jamming and even though it is under relatively heavy tension.

It is a further object of the invention to provide a snap hook which is of sufficiently strong construction to withstand the tensile and shock forces which may be encountered in use and which can be relied upon to be effective under any adverse condition of operation. In keeping with this object it is the aim to provide an environment free design which is positively and fully protected against corrosion or deterioration in storage or in use under all climatic conditions.

It is another object of the invention to provide a device having the characteristics mentioned above wherein the cooperating parts are constructed and arranged so that there is little likelihood such parts will catch on, or become entangled with, the user's clothing or other paraphernalia with which they are used.

Another object is to provide a snap hook equipped with a spring tempered guard element fabricated from a pair of pretreated parts without metallic fusion which are mutually interlocked and reinforced for effectively resisting deflection of the guard element even though the force is applied in a direction transverse to its normal direction.

It is a further object of the invention to achieve the above objectives in a device of a small size and a light weight little possessing an exceptionally high strength and degree of reliability so as to be particularly useful for parachute connections where both weight and safety are controlling factors.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawings:

FIG. 1 is an exploded perspective view of a snap hook embodying the present invention;

FIG. 2 is a side elevation view of the snap hook assembly;

FIG. 3 is a fragmentary end view of another embodiment of the invention having a modified strap engaging loop.

Figure 4:
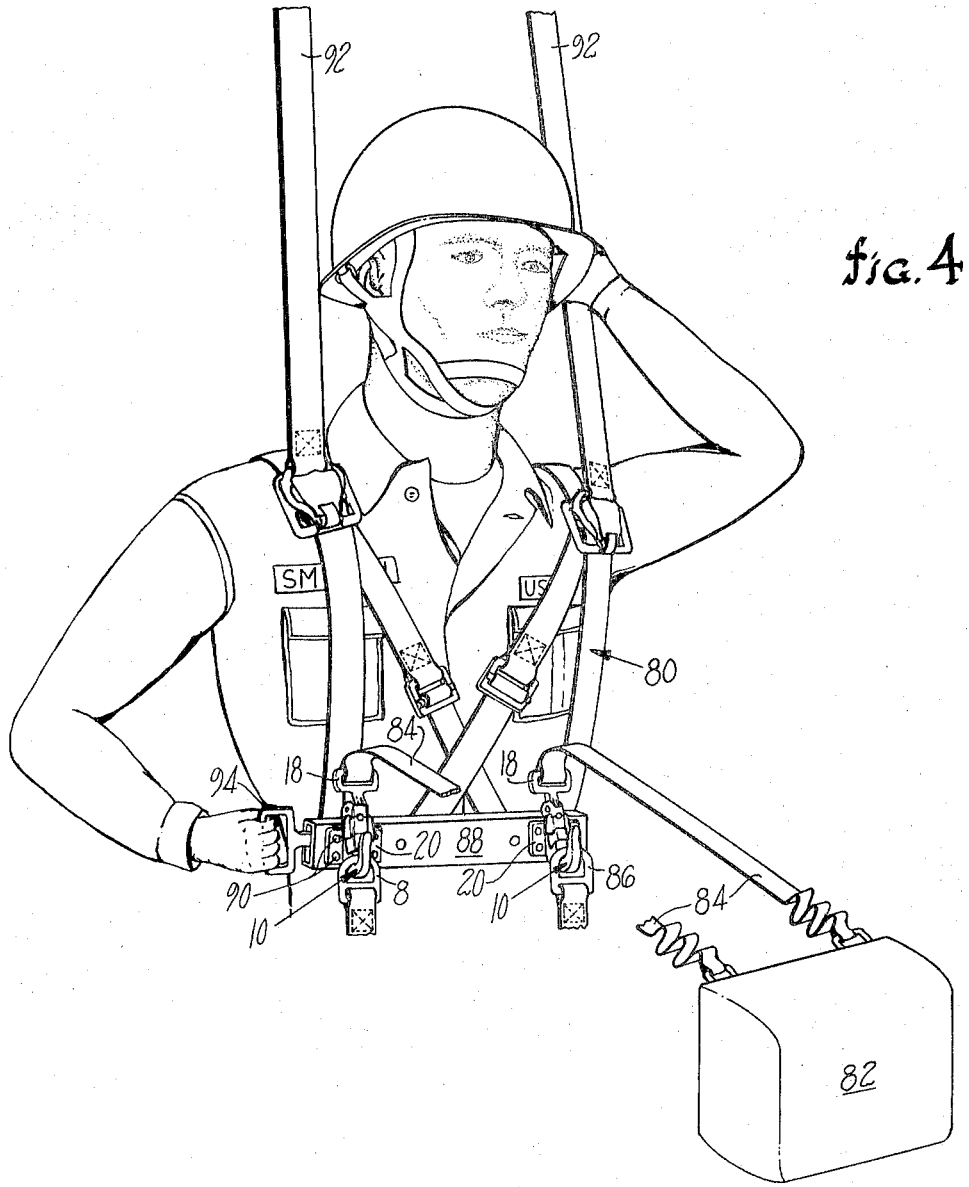
FIG. 4 is a perspective view illustrating one application of the snap hook of this invention to an emergency parachute.

Referring to the drawings, in which like numerals refer to like parts throughout the several views, the illustrated snap hook comprises a hook body 10 and a guard 12 pivotally connected thereto by a pivot pin 14.

Describing first the body 10 in detail, the body comprises a unitary steel forging having a hook 16 at one end, a strap engaging look 18 at the other, and a base plate 20 comprising a pair of laterally projecting wings forged integrally therewith.

When viewed in elevation, it will be observed that the hook 16 is essentially U-shaped and has a pair of spaced legs 24 and 26, the legs being connected by a curved bight designated by the reference numeral 32. For the purpose of pivotally accommodating the guard element 12, the body 10 is provided with integrally forged upstanding walls 34 defining a slot 36 with the walls 34 being apertured at 38 to receive the pivot pin 14.

An important feature of the invention is that the body 10 is formed as a unitary forging without the use of welding, soldering, or other metallic fusion techniques. In prior art snap hooks, the base plate 20 has been copper brazed to the hook 16. While the adhesion of the brazing material provides a bond of sufficient strength, the mating surfaces of the base plate 20 and the back of a forged hook are not exactly flat so that the brazing material has served as a thick filler which is significantly weaker in torsion and tension than the unitary forged construction of this invention. This is especially important when the sudden shock impact is applied in a direction transverse to its normal direction.

With respect to the specific construction of the guard 12, the guard is fabricated from two prehardened steel elements without the use of welding, soldering or other metallic fusion techniques. This is important in providing a low cost, high strength environment free design since it enables all surfaces of the latch element 44 and the finger element 46 to be given a protective treatment as, for example, by zinc or cadmium plating, prior to assembly since the fabrication does not damage the surface treatment, or affect the strength of the parts by tempering the prehardened elements 44 and 46.

The latch element 44 is of transverse U-shaped configuration and the depending sidewalls thereof are provided with aligned apertures 48 and one end thereof for receiving pivot pin 14 when assembled on the body 10 of the hook. The free or swinging end of the latch element 44 has, on the top wall thereof, a notch 52 which is received in the pair of like depressions 54 on the opposite sides of the tip of the hook 16 to straddle an intermediate rib 56 defining the depressions 54. A hairpin spring 58 is mounted by pivot pin 14 between the sidewalls 36 of the body portion 10 of the hook to bias guard 12 into latched position with the lower edges of the sidewalls 57 straddling the leg 24 of the hook as shown in FIG. 2.

It will be observed that the latch element 44 is provided with a cutaway portion or transverse slot 59. As best shown in FIG. 2, the slot 59 is formed in the crown of the latch element 44 by rearwardly facing edges 60 of the sidewalls of latch element 44. The edges 60 are shown as being disposed at an angle of about 60° with respect to the upwardly facing edges 62 of the sidewalls of the latch element 44 which are disposed above the plane passing longitudinally through the centers of the sidewalls thereof to define the bottom of transverse slot 59. The edges 64 of the latch element 44 forming the other end of slot 59 are generally perpendicular to the bottom edges 62.

The finger piece 46 comprises a crown portion 67, which is shaped so as to be complementary to slot 59 and dimensioned so as to snugly fit therein.

To assemble the finger piece 46 with the latch element 44, the front edge 61 of the crown portion 67 of finger piece 46 is moved into a position abutting and coplanar with the side walls of the latch element 44 and the rear end thereof pivoted downwardly into assembled position. The finger piece 46 is laterally held in this bridging dovetail relationship with the latch element 44 by means of the longitudinal extensions 70, 72 provided by the finger gripping portions 66, 68, respectively, of the finger piece 46 which overlap the sidewalls of the latching element 44. In addition, a headed rivet 74, preferably formed of stainless steel, is positioned in the aligned semicircular recesses 76, 78 respectively provided in the finger piece 46 and the latch element 44 to form an aperture for rivet 74 to secure the parts against relative pivotal movement.

Referring now particularly to FIG. 4, there is shown the application of the snap hook of this invention for connecting an emergency parachute to the usual parachute harness 80. As illustrated, the emergency parachute 82 is connected by a pair of shrouds 84 to a pair of snap hooks 10 which in turn are connected to a pair of D-rings 86 sewn to the harness 80.

As illustrated, the rectangular wing portions of the base plate 20 of each of the hooks 10 are fastened to a schematically illustrated attaching and operation plate 88 by any suitable means such as rivets 90.

The emergency parachute 82 is used when the primary parachute (not shown), connected to the harness 80 by the shrouds 92, fails to open and it is desirable to propel the emergency parachute 82 away from the user to such a direction that it will not become entangled with the primary parachute or its shrouds 92. This may be accomplished in any suitable manner (not shown) upon the release of the emergency parachute 82 from the attaching plate 88 as by pulling a handle 94. The parachute 82 may be ejected with a substantial force and the hooks 10 may be so disposed relative to the D-rings 86 that the impact of withstanding the ejecting force will be borne by the guard 12 rather than the hook portion 16 of the snap hook 10. Moreover, the initial impact of chute opening may be applied in a transverse direction to apply a torsional force between the hook 16 and the base plate 20. Accordingly, it is vitally essential that the guard and the connection between the hook 16 and base plate 20 have sufficient strength to withstand this force and that there be no deterioration in the strength of the guard even after a long period of storage or use under any and all climatic conditions.

Upon reaching the ground, it is further essential that the parachutist be able to quickly open the snap hooks 10 to disconnect them from the D-rings 86 under all conditions without interference by his clothing or other equipment or parts of the parachute harness. Because the wing portions 66, 68 of the finger piece are spaced substantially at the top of the guard 12, and a substantial distance above the base plate 20 of the snap hook 10, the guard may be depressed without regard to the interposition of any articles between the wings 66, 68 and the base plate 20 despite the fact that the wings 66, 68 overlap the sidewalls of the latching element 44 to reinforce the latching element.

The modified embodiment of FIG. 3 is suited for use with presewn loops on the end of straps or shrouds 92. As shown, the bar 18a is formed as a separate headed member having a head 19 at one end and a threaded bore 21 at the other. With the bar 18a inserted into the countersunk apertures 23, 25, a headed screw 27 is threaded into the bore 21 to secure the bar 18a to the hook 10.

From the foregoing, it will be readily apparent that the construction of the snap hook 10 results in a design wherein the parts may be independently prehardened as desired and wherein all of the exposed surfaces thereof may be pretreated before assembly so that there are no unprotected areas in the assembled product which are radially susceptible to atmospheric corrosion under diverse environmental conditions. The assembly is formed without seams or crevices as would result from a laminated metal construction, or where metallic fusion is utilized, and the finger piece 46 being coplanar with the top surface of the latch 44 and having wing portions 66, 68 which overlap the sidewalls of the latch 44 reinforces the same without the use of extra metal or increasing the height of the guard 12. In addition, the wing portions 66, 68 of the finger piece 46 are disposed near the top of the guard 12 to leave the maximum clearance with the base plate 20 of the hook 16 thereby minimizing the likelihood that the user's clothing will prevent the rapid release of the hook.

As will be apparent to persons skilled in the art, various modifications and adaptations of the structure abovedescribed will become readily apparent without departure from the spirit and scope of the invention, the scope of which is defined in the appended claims.

I claim:

1. A snap hook comprising a forged body provided with a base plate for attachment to a harness and the like, and a guard pivotally mounted on said hook and resiliently biased to close the same, said pivoted guard comprising a pair of interlocked members, the pivoted one of said interlocked members having a crown portion and depending sidewalls having a transverse dovetail slot, the other of said interlocked members being shaped so as to be complementary with the transverse slot and dimensioned to be closely received within the slot with its walls coplanar with the walls of the pivoted member, the bottom portions of the sidewalls of said other of said interlocked members being bent laterally to provide wing members, said wing members being longer than said dovetail slot to overlap said dovetail slot to laterally reinforce said pivoted one of said interlocked members.

2. A device as recited in claim 1 wherein the free end of the pivoted guard is slotted and straddles a rib on the tip of the hook.

3. A device as recited in claim 1 wherein said wing members are spaced adjacent the crown of the guard and a substantial distance from the base plate.

4. A device as recited in claim 3 wherein said interlocked guard members are secured together without metallic fusion.

5. A device as recited in claim 4 wherein each of said interlocked members are formed of a prehardened metal and are treated prior to assembly to provide full surface protection against corrosion.

* * * * *

UNITED STATES PATENT OFFICE
CERTIFICATE OF CORRECTION

Patent No. 3,831,229          Dated August 27, 1974

Inventor(s) Wilbur J. Craven

It is certified that error appears in the above-identified patent and that said Letters Patent are hereby corrected as shown below:

Column 1, line 36, cancel "little" and substitute therefor --while--.

Column 1, line 66, cancel "look" and substitute therefor --loop--.

Column 3, line 28, cancel "to" and substitute therefor --in--.

Signed and sealed this 26th day of November 1974.

(SEAL)
Attest:

McCOY M. GIBSON JR.                C. MARSHALL DANN
Attesting Officer                  Commissioner of Patents